May 10, 1966  E. G. SPYRIDAKIS  3,250,109

METHOD FOR ORIENTING GRAIN FLOW

Filed July 25, 1962

INVENTOR
EMANUEL G. SPYRIDAKIS
BY
HIS ATTORNEY

United States Patent Office 3,250,109
Patented May 10, 1966

3,250,109
METHOD FOR ORIENTING GRAIN FLOW
Emanuel G. Spyridakis, Sayre, Pa., assignor to Ingersoll-Rand Company, New York, N.Y., a corporation of New Jersey
Filed July 25, 1962, Ser. No. 212,255
3 Claims. (Cl. 72—363)

The present invention relates to the manufacture of metals and plastics and more particularly to an improved method for orienting grain or fiber flow in such metals and plastics.

Heretofore, the parts for impact tools (of the type shown in U.S. Patent No. 2,691,434 issued October 12, 1954 to F. A. Jimerson) have been manufactured from bar stock of steel, metal alloys, plastics and similar materials having the direction of fiber or grain flow parallel to the longitudinal axis of the bar stock. For example, during the machining of (and in the use of) the hammer for an impact wrench, such hammer has several impacting surfaces where the machining or impacting force is applied at right angles to the normal longitudinal fiber or grain flow in the bar stock from which the hammer is fabricated with resultant minimum tensile strength and attendant abrasion and breakage at these surfaces. In order to provide sufficient tensile strength and wear resistance in such hammers, it is necessary to form the hammer blanks by forging with resultant variable density in the blank and attendant difficulty in heat treatment thereof.

I am aware of prior art attempts at solving this problem of the type shown in U.S. Patent No. 1,525,730 issued February 10, 1925 to S. C. Gates; U.S. Patent No. 1,826,077 issued October 6, 1931 to A. J. Johnson; U.S. Patent No. 1,967,487 issued July 24, 1934 to H. L. Waisner; and U.S. Patent No. 1,998,108 issued April 16, 1935 to H. L. Waisner.

It is the general object of the present invention to avoid and overcome the foregoing and other difficulties of and objections to prior art practices by the provision of an improved method of orienting the fiber flow in bar stock which method provides fiber flow which is a substantially flat spiral fiber flow transverse to the longitudinal axis of the bar stock.

Another object of the present invention is the provision of an improved method of orienting the fiber flow in bar stock thus increasing its torsional and tensile strength, its wear and abrasive resistant qualities and its machinability.

Yet another object of the present invention is the provision of an improved method of orienting the fiber flow in bar stock, which method utilizes the conventional forging operation with its attendant increased density in the bar stock.

The aforesaid objects of the present invention, and other objects which will become apparent as the description proceeds, are achieved by providing an improved method of orienting the fiber flow in bar stock comprising the steps of heating the bar stock to its rolling temperature, twisting the bar stock to helically direct the fiber flow of the bar stock and flattening the bar stock to provide a substantially flat spiral fiber flow therein.

For a better understanding of the present invention reference should be had to the accompanying drawings, wherein like numerals of reference indicate similar parts throughout the several views and wherein.

Although the principles of the present invention are broadly applicable to the manufacture of metal or plastic parts, the present invention is particularly adapted for use in conjunction with the manufacture of hammers for impact wrenches and hence it has been so illustrated and will be so described.

Figure 1:
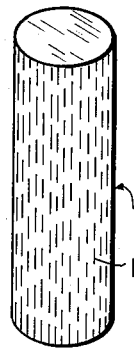
FIG. 1 is a side elevational view of conventional bar stock having the fiber flow parallel to the longitudinal axis of the bar stock.
Figure 2:
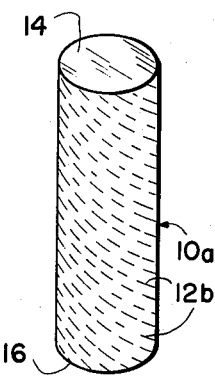
FIG. 2 is a view similar to FIG. 1 after the bar stock has been heated and twisted to provide helical fiber flow therein.

With specific reference to the form of the present invention illustrated in the drawings, and referring particularly to FIG. 1, a wrought metal bar stock, such as rolled or extruded steel bar or bar stock (AISI4820 steel) is indicated generally by the reference numeral 10. As indicated in FIG. 1 the fiber flow indicated generally and collectively by the reference numeral 12 is substantially parallel to the longitudinal axis of the bar stock 10. In order to orient the fiber flow 12 into a helical arrangement, the bar stock 10 is first heated to a plastic condition at about its rolling temperature, such as about 180°–2000° F., in this example, and while at this temperature is twisted to produce a spiral fiber flow 12a (FIG. 2). Such twisting of the heated bar stock 10 is accomplished by imparting rotation to one end 14 of the bar stock 10 while holding the other end 16 stationary in the chucks of a lathe (not shown) or by securing the end 16 in a vise (not shown) and twisting the end 14 by means of pliers or a wrench (both not shown). Thereafter the twisted bar stock 10a at its forging temperature (about 1800–2000° F.) is flattened by means of a press (not shown) or by a hand held hammer (not shown) to produce the bar stock 10b (FIG. 3) having substantially flat spiral fiber flow 12b.

Figure 3:
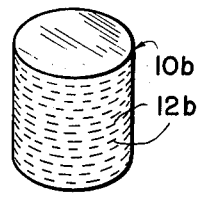
FIG. 3 is a view similar to FIGS. 1 and 2 in which the bar stock has been flattened to provide a substantially flat spiral fiber flow therein.
Figure 5:
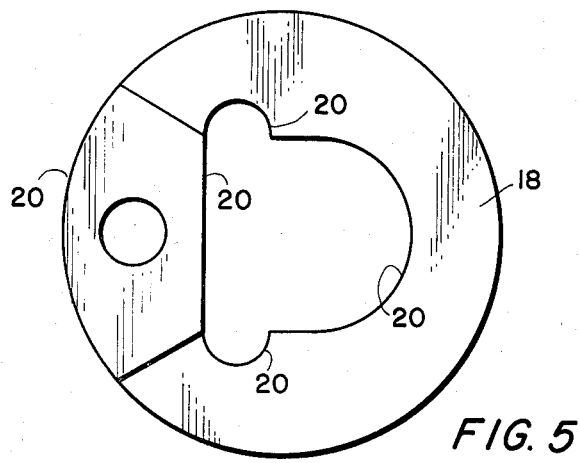
FIG. 5 is a plan view of the hammer shown in FIG. 4.
Figure 4:
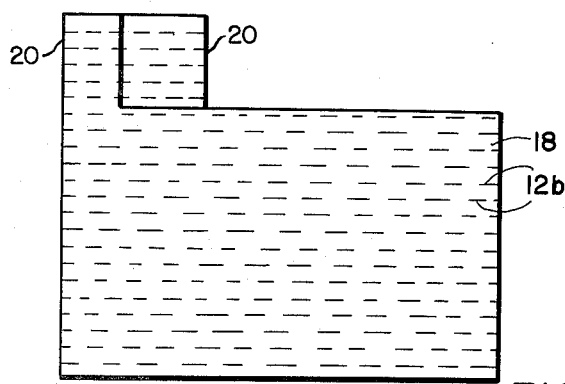
FIG. 4 is a side elevational view of a hammer for an impact wrench which hammer has been fabricated by the improved method of the present invention.

Thereafter the flattened bar stock 10b is machined into the hammer 18 (FIGS. 4 and 5) where it will be noted that the fiber flow 12b remains essentially as it was in FIG. 3, thereby providing increased strength and wear and abrasive resistance at the critical surfaces 20 in the hammer 18. The improved method of the present invention works very satisfactorily in the manufacture of bevel gears.

It will be understood by those skilled in the art that alternatively the bar stock 10 may be formed of an extruded thermo-plastic, such as nylon, the trade name for a plastic manufactured by E. I. du Pont de Nemours & Co., Inc. of Wilmington, Delaware, and the above described method repeated. In the case of the nylon, the bar stock 10 is heated to near its extruding temperature, such as about 440–600° F.

Other examples of suitable extruded thermo-plastics are: "Alcylite," a trade name for a plastic manufactured by Alcylite Plastics and Chemical Corp. of Newhall, California (heating temperature about 470–720° F.); "Cadco," a trade name for a plastic manufactured by Cadillac Plastic and Chemical Co. of Detroit, Michigan (heating temperature about 440–600° F.).

It will be recognized by those skilled in the art that the objects of the present invention have been achieved by providing an improved method of orienting the fiber flow in wrought metal or plastic bar stock, which method provides a substantially flat spiral fiber flow transverse to the longitudinal axis of the bar stock. This improved method provides increased tensile and torsional strength, increases wear and abrasive resistance and the machinability of the part while utilizing a conventional forging operation with its resultant increased density in the bar stock.

While in accordance with the patent statutes preferred and alternative embodiments of the present invention have been illustrated and described in detail, it is to be particularly understood that the invention is not limited thereto or thereby.

I claim:

1. A method for orienting the fiber flow in bar stock comprising the steps of:
   (a) heating said bar stock to its rolling temperature,
   (b) twisting said bar stock to helically direct said fiber flow of said bar stock, and
   (c) flattening said bar stock longitudinally along its axis at its forging temperature to provide substantially flat spiral fiber flow therein.

2. A method for orienting the fiber flow in metal bar stock comprising the steps of:
   (a) heating said metal bar stock to its rolling temperature,
   (b) twisting said metal bar stock to helically direct said fiber flow of said metal bar stock, and
   (c) flattening said metal bar stock longitudinally along its axis at its forging temperature to provide substantially flat spiral fiber flow therein.

3. A method for orienting the fiber flow in plastic bar stock comprising the steps of:
   (a) heating said plastic bar stock to its extruding temperature,
   (b) twisting said plastic bar stock to helically direct said fiber flow of said plastic bar stock, and
   (c) flattening said plastic bar stock longitudinally along its axis at an elevated temperature to provide substantially flat spiral fiber flow therein.

References Cited by the Examiner

UNITED STATES PATENTS

| | | | |
|---|---|---|---|
| 1,632,533 | 6/1927 | Brauchler | 29—553 XR |
| 1,826,077 | 10/1931 | Johnson | 153—78 |
| 1,967,487 | 7/1934 | Waisner. | |
| 1,998,108 | 4/1936 | Waisner. | |
| 2,064,323 | 12/1936 | Schmidt et al. | 29—553 |
| 2,522,499 | 9/1950 | Berglund et al. | 153—7c |

WHITMORE A. WILTZ, *Primary Examiner.*

P. M. COHEN, J. C. HOLMAN, *Assistant Examiners.*